US012789358B2

(12) United States Patent
Biehler et al.

(10) Patent No.: US 12,789,358 B2
(45) Date of Patent: Nov. 10, 2026

(54) METHOD FOR CONTACTLESS TRACKING OF AN EXTREMITY IN AN EXOSKELETON AND EXOSKELETON

(71) Applicant: Advanced Bionic Systems GmbH, Munich (DE)

(72) Inventors: Maximilian Biehler, Inchenhofen (DE); Marius Kiss, Augsburg (DE)

(73) Assignee: Advanced Bionic Systems GmbH, Munich (DE)

( * ) Notice: Subject to any disclaimer, the term of this patent is extended or adjusted under 35 U.S.C. 154(b) by 700 days.

(21) Appl. No.: 18/266,008

(22) PCT Filed: Apr. 25, 2022

(86) PCT No.: PCT/EP2022/060816
§ 371 (c)(1),
(2) Date: Jun. 8, 2023

(87) PCT Pub. No.: WO2022/238095
PCT Pub. Date: Nov. 17, 2022

(65) Prior Publication Data

US 2024/0033900 A1 Feb. 1, 2024

(30) Foreign Application Priority Data

May 14, 2021 (DE) ..................... 10 2021 112 561.8

(51) Int. Cl.
*B25J 9/00* (2006.01)
*A61H 3/00* (2006.01)
*B25J 13/08* (2006.01)

(52) U.S. Cl.
CPC .............. *B25J 9/0006* (2013.01); *A61H 3/00* (2013.01); *B25J 13/085* (2013.01); *B25J 13/088* (2013.01); *A61H 2201/165* (2013.01)

(58) Field of Classification Search
CPC ......... B25J 9/0006; B25J 13/088; A61H 3/00; A61H 1/0237–0288; A61H 2001/0248–027; A61H 2201/165
See application file for complete search history.

(56) References Cited

U.S. PATENT DOCUMENTS 10,987,797 B2 4/2021 Ko
2007/0123997 A1 5/2007 Herr
(Continued)

FOREIGN PATENT DOCUMENTS

DE 10 2017 129 021 A1 1/2019
EP 2977039 A1 1/2016

OTHER PUBLICATIONS

International Preliminary Report on Patentability for PCT/EP2022/060816, filed Apr. 25, 2022.
(Continued)

*Primary Examiner* — Brandy S Lee
*Assistant Examiner* — Sara K Toich
(74) *Attorney, Agent, or Firm* — Fleit Intellectual Property Law; Paul D. Bianco

(57) ABSTRACT

An exoskeleton includes: a torso attachment; a hip frame rigidly connected to the torso attachment; first and second actuators, each fastened to the hip frame for supporting walking or bending motion of a wearer; first and second thigh attachments, each assigned to an actuator; first and second guide/carrier structures for transmitting forces between one of the thigh attachments and the actuator assigned to this thigh attachment in each case; and a control unit for actuating the actuators. A distance sensor for contactless monitoring of the position of a thigh of the wearer relative to the thigh attachment is located in each thigh attachment. In a method of use, the control unit can control the actuator in a first operating mode such that the attachment is kept at a predefined distance from the extremity and
(Continued)

a second operating mode such that the attachment bears against the extremity in a force-conducting manner.

13 Claims, 7 Drawing Sheets

(56) References Cited

U.S. PATENT DOCUMENTS

| | | | | |
|---|---|---|---|---|
| 2009/0255531 | A1* | 10/2009 | Johnson | A61F 5/24 128/99.1 |
| 2014/0039371 | A1* | 2/2014 | Johnson | B25J 9/0006 602/19 |
| 2014/0190536 | A1* | 7/2014 | Friedman | G08C 19/00 340/4.1 |
| 2016/0242986 | A1* | 8/2016 | Nagata | A61F 2/70 |
| 2017/0049658 | A1* | 2/2017 | Kim | A61H 3/00 |
| 2017/0065441 | A1* | 3/2017 | Lee | A61F 2/72 |
| 2018/0177669 | A1* | 6/2018 | Cho | A61H 3/00 |
| 2019/0307583 | A1* | 10/2019 | Herr | A61F 2/68 |
| 2019/0375106 | A1* | 12/2019 | Lee | A61F 2/70 |
| 2021/0007874 | A1 | 1/2021 | Galiana Bujanda | |

OTHER PUBLICATIONS

International Search Report and Written Opinion for PCT/EP2022/060816, filed Apr. 25, 2022.
Result of Examination Report for German Application No. 10 2021 112 561.8 filed May 14, 2021.

* cited by examiner state of the art

METHOD FOR CONTACTLESS TRACKING OF AN EXTREMITY IN AN EXOSKELETON AND EXOSKELETON

FIELD OF THE INVENTION

The invention relates to an exoskeleton for supporting a walking or bending movement of a wearer.

BACKGROUND

Exoskeletons are artificial, mechanical support structures attached to a wearer's body from the outside to relieve or support the wearer's body muscles. As active exoskeletons, i.e. exoskeletons with active, mostly electromotive actuators, they are used, for example, to support walking or bending movements and thus must transmit or initiate forces or torques between the wearer's limbs and torso.

FIG. 1 shows an exoskeleton for walking and bending support. The exoskeleton 100 comprises an upper body connection structure 101, which is designed as a rigid back plate with a carrying harness, to which a rigid hip frame 102 is attached. The upper body connection structure 101 can be connected to the upper body of a wearer in a manner similar to a backpack. A left and a right actuator 103A and 103B are arranged laterally on the outside of the hip frame 102, each having an output shaft 103 which is being connected to a respective channel-and-support structure 106A and 106B. Thigh support structures (thigh attachments) 104A and 104B are attached to the channel-and-support structures 106A/B.

The actuators 103 can be used to generate an erecting moment between each thigh support structure 104A/B and the upper body connection structure 101, i.e. between a thigh and the upper body of the wearer.

In prior art exoskeletons, thigh support structures are permanently connected to a left or right thigh of the wearer via straps enclosing the thigh. Such straps are cumbersome to put on and uncomfortable for the wearer, as they tend to rub against the skin, hinder free breathing of the skin and can lead to sores.

In order to be able to introduce a supporting torque into the thighs when needed, it must be ensured that thigh support structures are in contact with and rest on the respective thigh at all times. This is naturally achieved when the thigh moves forward (forward in relation to the sagittal plane usually used in anatomy).

When the thigh moves backwards, however, there is no natural contact between the thigh and the thigh support. For readjustment or tracking, a backward directed moment must act on the thigh support structure or the associated actuator from the outside.

In the state of the art, this is realised e.g. via elastic tension straps which run posteriorly between a hip frame and leg straps of thigh support structures. The wearer must therefore apply additional force against the tension straps during a forward movement of the thigh. Another disadvantage of tension straps is that they can easily get caught or be accidentally caught by passing vehicles such as forklift trucks. Therefore, at least in some areas of application, exoskeletons with tension straps cannot be used for safety reasons.

It is also known from the prior art to ensure the continuous contact of the thigh attachments to the thigh in a torque-controlled manner: In this case, a control unit of the exoskeleton always controls an actuator so that at least a minimal torque is applied to the thighs. In this case, too, the wearer must always work against this torque when moving the thigh forward. Such a control of the actuators is disadvantageous, on the one hand because the wearer always has to apply an additional force to overcome the torque applied via the actuator in order to move a thigh, and on the other hand because the generation of a torque via the exoskeleton's actuator consumes energy and shortens a period of use of the exoskeleton.

SUMMARY OF THE INVENTION

Against this background, an objective is to provide an exoskeleton that overcomes at least some disadvantages of the prior art.

The method according to the invention is based on the idea of replacing a torque-controlled control of the exoskeleton by a distance-based control at least in the case of an idle state (hereinafter referred to as the first operating mode) of the exoskeleton, in which an attachment structure, e.g. a thigh attachment structure (thigh support structure), does not touch the body limb assigned to the attachment structure, e.g. a thigh. Idle state means a state in which the wearer of the exoskeleton does not wish to be actively supported by the exoskeleton and therefore no active forces are to be transmitted to the wearer. Such a state may be, for example, walking.

The method according to the invention provides for controlling an actuator of a channel-and-support structure of an exoskeleton in a selective manner via a control unit. In this case, the channel-and-support structure has an attachment structure for supporting an extremity of a wearer associated with said attachment structure, for example a finger limb, a limb of the leg and/or an arm limb. The attachment structure is designed for direct contact with the limb, for example in the form of a half shell, and is in direct force flow with the actuator via the channel-and-support structure. A distance sensor is arranged in the attachment structure for measuring the distance between the attachment structure and the limb assigned to it, wherein the control unit controls the actuator in a first operating mode in such a way that the attachment structure is held at a predefined distance from the limb. The predefined distance may be, for example, 2 mm, 4 mm or even 6 mm when understanding distance as the shortest distance between the distance sensor and the limb. In other words, the attachment structure does not touch the limb in this first operating mode. The wearer is free to move the limb forward or backward, for example, and the control unit will control the attachment structure to uphold the predefined distance when moving forward or backward. The attachment structure is thus tracking the (moving) limb without contact and in real time while maintaining the predefined distance.

In the first operating mode, also referred to as idle mode, no active forces are applied to the limb via the exoskeleton. This is advantageous for the wearer, as he or she does not have to overcome any counter-torques of the exoskeleton. Furthermore, the attachment structure can be kept at a distance so that skin contact and thus sweating of the wearer is avoided or at least reduced. In contrast to the solutions described above, neither tension straps nor girding of the thigh is necessary. This simplifies the mechanical construction of the attachment structure. It also makes it easier to put on and take off the exoskeleton.

The control unit also controls the actuator in a second operating mode such that the attachment structure abuts upon the limb in a force-conducting, i.e. contacting, manner. In this second operating mode, hereinafter also addressed as "support mode", a support force can and shall be introduced from the exoskeleton into the limb to support or relieve certain muscle parts of the wearer.

The change between the first and second operating mode takes place depending on at least one variable from the following group:

- an erection angle of the upper body or an upper body connection structure of the wearer,
- a rate of change of the erection angle,
- an inclination angle of the or an extremity or the channel-and-support structure associated with it,
- a rate of change of an inclination angle of the or a limb or the channel-and-support structure associated with it,
- a comparison of the inclination angle of the limb or its associated channel-and-support structure with a second inclination angle of a second limb of the wearer or its associated channel-and-support structure,
- an applied torque in or on the actuator.

The erection angle is the angle of the upper body of the wearer with respect to the vertical. Alternatively, it means the technically equivalent upright angle of the exoskeleton's upper body connection structure. The erection angle for a person standing upright is therefore 0°. The inclination angle of an extremity in the anatomical sense means the angle between a major axis of the extremity and the upper body. For the purposes of the present invention, inclination angle means the technically equivalent angle between the channel-and-support structure associated with the limb and a major axis of an attachment structure part to which the channel-and-support structure is connected, minus 180°. The inclination angle thus means the relative angle of the channel-and-support structure with respect to an initial position in which the channel-and-support structure is arranged at an angle of 180° with respect to the upper body connection structure.

Angles are preferably understood to mean the angles in the sagittal plane. Other angular directions are possible.

The method allows switching between the first and second operating modes as needed, with the wearer having full support from the exoskeleton in the second operating mode.

The invention also relates to an exoskeleton:

The exoskeleton comprises an upper body connection structure, a hip frame fixedly connected to the upper body connection structure, and a first or second actuator respectively and preferably laterally attached to the hip frame for supporting a walking or bending movement of a wearer. The upper body connection structure may, for example, be designed as a carrying harness with a rigid back plate.

Furthermore, the first and the second actuator are each assigned a first and a second thigh support structure, respectively, whereby the assignment is made via a first and a second channel-and-support structure, respectively, which extends between the thigh support structure and the actuator or an output shaft or an output flange of the actuator. The first and second channel-and-support structure can be used to transmit forces between a respective thigh support structure and the actuator associated with this thigh support structure. The thigh support structure is preferably designed as a rigid half shell that covers an anterior part of the thigh.

The exoskeleton also comprises at least one control unit (also: controller) for controlling the actuators. A (first or second) distance sensor is arranged in each (first or second) thigh support structure for contactless tracking of the position of a (first or second) thigh of the wearer relative to the (first or second) thigh attachment. The distance sensor measures the distance between the thigh support structure and the thigh in real time so that the control unit can keep the thigh support structure at a predefined distance relative to the thigh even if the thigh is moving.

Such an exoskeleton can increase the wearer's comfort and, in particular, may implement the procedure described above.

Advantageously, one or each distance sensor is a capacitive distance sensor, an optical distance sensor or an ultrasonic distance sensor. Capacitive sensors measure electrical charge changes of a charge carrier due to objects brought close to them, here e.g. a thigh. Capacitive sensors are inexpensive, but due to fluctuating electrical properties on the thigh, they are costly and have to be (re)calibrated regularly. Optical and ultrasonic sensors allow very high resolution accuracies and thus precise distance measurement with smaller fluctuation ranges.

Expediently, each of the distance sensors is arranged in a pocket of the thigh support structure. A pocket is understood to be a rearward recess on a side of the thigh support structure facing the thigh, in which the distance sensor can be 'burned'. Consequently, the distance sensor does not protrude from the thigh support. In particular, when using a soft thigh pad or a compressible thigh cushion connected to the thigh support structure, the distance between the thigh support structure and the distance sensor can be adjusted so that the thigh pad or thigh cushion rests against the thigh in a non-compressed state. This can give the wearer the feeling of permanent availability of the exoskeleton in an idle state without the user having to overcome counterforces, as the control unit keeps the distance between the thigh support structure and the thigh continuously at the predefined distance even when the thigh is moving.

The control unit of the exoskeleton for controlling the actuators is advantageously set up to perform contactless tracking of the thighs in a first operating mode (idle mode) without supporting a walking movement of the wearer: In this case, the control unit controls the actuators in such a way that each thigh support structure is in each case at a predefined distance unequal to 0 from the thigh assigned to it. This means that there is always a gap between the thigh and the thigh support structure, in which air can circulate, for example. This can give the wearer the feeling of a floating thigh support.

The control unit may be, for example, a microcontroller with a CPU, a data interface for input and output of data signals and a memory comprising instructions stored on the memory for processing incoming data signals.

The control unit is expediently set up to control the actuators in a second operating mode (support mode) to support a bending movement in such a way that, in the second operating mode, each thigh support structure is in contact with its associated thigh in a force-conducting manner. In this state, the wearer can be relieved, especially in the lower back musculature, and be supported when straightening up.

A change between the first and the second operating mode and vice versa can take place under certain permanently or variably defined boundary conditions, in particular if certain variables are present, in particular those determined by sensors of the exoskeleton. Different boundary conditions can be selected for changing from the first to the second operating mode than for changing back from the second operating mode. A certain operating mode of the control unit can also be permanently set on the exoskeleton, for example via a touch-sensitive screen, i.e. such that a change between the operating modes does not take place or only at the request of the wearer.

Advantageously, an erection angle of the upper body connection structure with respect to the vertical in the sagittal plane can be used as a variable for changing the operating mode. For this purpose, the exoskeleton has an inertial unit at the upper body connection structure for detecting the sagittal erection angle. The inertial unit can, for example, be attached to the upper body connection structure, in particular to a rigid back plate of the same. The control unit of the exoskeleton is arranged to remain in the first operating mode and/or to change from the second to the first operating mode as long as or when the erection angle of the upper body connection structure is moving within a predetermined angular range or enters the predetermined angular range. The angular range may expediently be ±20° with respect to the vertical.

Such an angular range corresponds approximately to the angle of the upper body in a standing or walking human. However, the angle range could also be larger, e.g. ±30° or asymmetrical, e.g. ranging between −10° and +20°. By choosing an angle range that is appropriate depending on the application, the first operating mode can be set automatically by the exoskeleton's control unit. This eliminates the need for the wearer to manually switch between the operating modes.

Similarly, it can be advantageous if the control unit is set up to remain in the second operating mode and/or to switch from the first to the second operating mode (support mode) as long as or when the alignment angle of the upper body connection structure moves outside the predefined angle range. This allows the wearer to be actively supported by the exoskeleton, especially in a stooped position.

As alternative or additional criteria for switching between operating modes, the exoskeleton may comprise two angle sensors for detecting a (first and second) inclination angle between the upper body connection structure and each (first and second) channel-and-support structure. The inclination angle can be defined as the angle in the sagittal plane between the upper body connection structure and the channel-and-support structure (or its longitudinal axis). It is to be assumed that the channel-and-support structure has a unique longitudinal axis that approximately corresponds to the longitudinal axis of the thigh. An inclination angle thus corresponds approximately to the bending angle between the hip and the thigh (thigh bone).

In an expedient embodiment, the control unit is set up in such a way that it changes from the first to the second operating mode when both inclination angles of the channel-and-support structures enter a predefined angle range essentially synchronously. In practice, this means that the control unit changes the operating mode when the wearer, for example, squats or bends his upper body in order to lift a load. The angular position of the thighs and thus of the channel-and-supporting structures is usually consistent during such body exercises. By taking the inclination angle into account, an alternative possibility for switching the operating modes is given.

Inclination angle has the meaning of the relative angular deviation between the channel-and-support structure and the upper body connection structure, which deviates from the angular position in which the channel-and-support structure is aligned in straight extension of the upper body connection structure.

However, a change between the operating modes can also be made dependent on the consideration of a plurality of criteria, especially the combination of the inclination angles and the erection angle. If the inclination angles are taken into account in addition to the erection angle of the upper body, a plausibility check (redundancy) can be carried out, for example, and the error rate of an unintentional change of the operating modes can be reduced.

The predefined angular range of the inclination angle can, for example, advantageously be set at less than 45° with respect to an initial position or an initial angle of 180° with respect to the upper body connection structure. The initial position or the initial angle is an angle between the upper body connection structure and the channel-and-support structure of 180°, i.e. in which the channel-and-support structure is aligned in a straight-line with the upper body connection structure.

An inclination angle of −45° (45° in terms of magnitude) corresponds to an absolute inclination angle of the thigh relative to the vertical of 135° for an upright person (erection angle of 0°). This can be a suitable criterion to detect an initial lifting movement of a wearer. Depending on the application, the angle range can also be larger or smaller or individually selected or adapted, i.e. user-specific.

At the same time, the control unit may advantageously be set up to change from the second to the first operating mode when both inclination angles of the channel-and-support structures exit the predefined angular range essentially synchronously, in particular an angular range of more than 20° (i.e. an absolute angle of 160° in the case of an erection angle of 0°). This can be a suitable criterion to determine a completed lifting movement of a wearer.

Furthermore, in a further and advantageous embodiment, the inertial unit of the exoskeleton comprises an acceleration sensor for detecting the acceleration values of the upper body connection structure. The exoskeleton can additionally or alternatively also comprise a (first or second) torque sensor for detecting the torque applied to the (first or second) actuator and/or a (first or second) angular velocity sensor for detecting the angular velocity of the (first or second) actuator. These sensors can be used to further check and increase the plausibility of the conditions for changing the operating modes.

In a particularly advantageous embodiment, the control unit is set up to change from the first to the second operating mode precisely when one of the torque sensors of the first or second actuator measures a torque not equal to 0. In this way, an immediate change of the operating modes can be initiated independently of an angle measurement of the inclination angle and/or erection angle. This case may be occurring, for example, in the case of rapid movements, especially in the case of a wearer falling down.

Advantageous further modifications and further features of the invention are presented in the subclaims and the following description.

DETAILED DESCRIPTION

Figure 1:
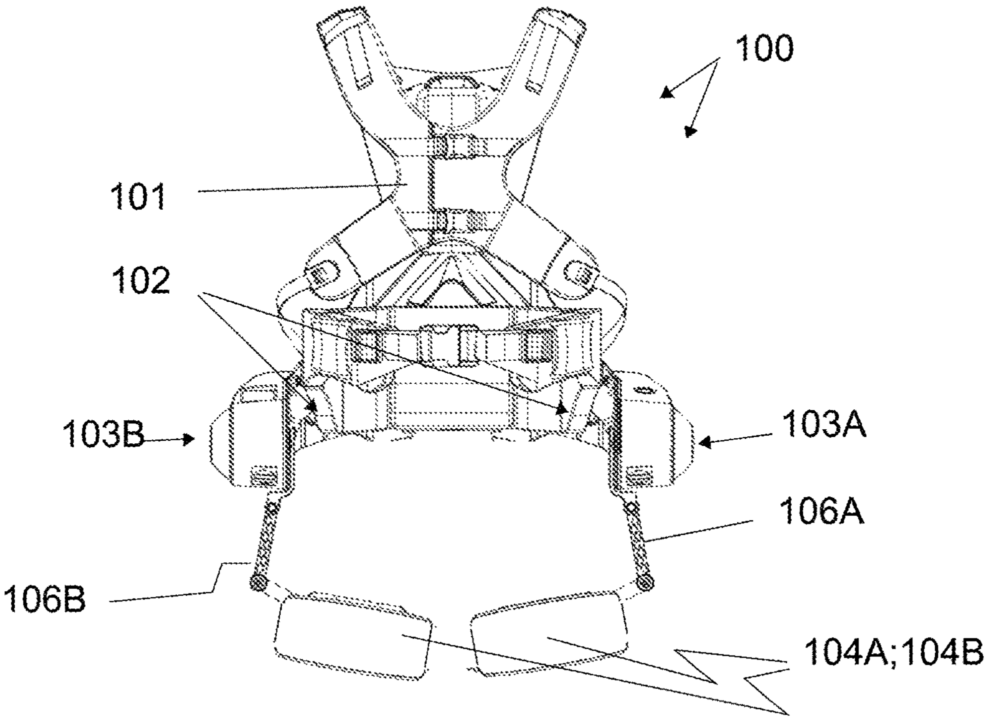
FIG. 1 a frontal view of an exoskeleton according to the invention.

FIG. 1 shows the example of the exoskeleton 100 already outlined in the introductory part of the description, where the thigh support structures 104A/B are not firmly connected to the thighs of a wearer via straps, but may only abut upon the front of the thighs in a form-locking manner. The thigh attachments 104A/B are formed as a half shell. There is no further connection between the thighs and the thigh support structure 104A/B, so that the wearing comfort is high due to the small contact surfaces between the thighs and the thigh support structure 104A/B, and the thigh support structures 104A/B can also be connected to the thighs easily and without effort, cf. the following explanation of FIG. 2. Distance sensors are installed in the thigh support structures 104A/B analogous to the examples in FIGS. 2 and 3. The distance sensors may be used to switch between two operating modes, namely with contactless tracking of the thighs by the thigh support structures and without torque support (first operating mode) and with the thigh support structures abutting upon the thighs and with torque support (second operating mode). The exoskeleton, in particular its actuators, can be controlled via a control unit of the exoskeleton.

Figure 2:
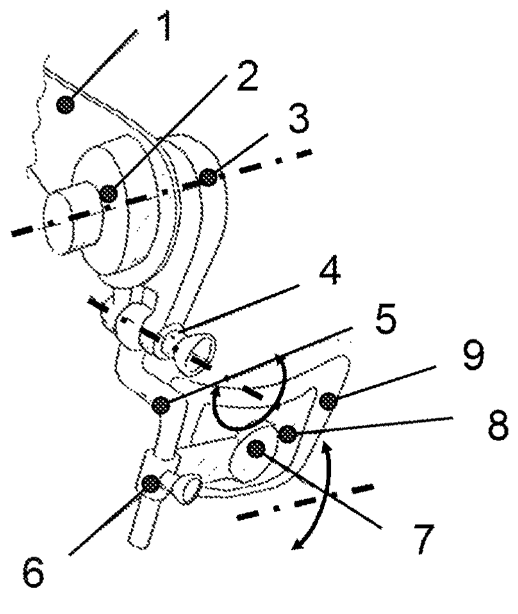
FIG. 2 a channel-and-support structure between a thigh support structure and an actuator, FIG. 3 a channel-and-support structure between a thigh support structure and an output flange of an actuator with a distance sensor arranged in the thigh support structure, FIG. 4 a schematic representation of an exoskeleton in neutral position, FIG. 5 a schematic representation of an exoskeleton in a first operating mode with asynchronous movement of channel-and-support structures, FIG. 6 a schematic representation of an exoskeleton shortly before a change from a first to a second operating mode with synchronous movement of channel-and-support structures, FIG. 7 a schematic representation of an exoskeleton shortly before a change from a second to a first operating mode with synchronous movement of channel-and-support structures, FIG. 8 a schematic representation of a control circuit, FIG. 9 a schematic representation of a control of an exoskeleton in a first operating mode, and FIG. 10 a schematic representation of a control of an exoskeleton in a second operating mode.

FIG. 2 shows a lateral section of a hip frame 1 (similar to the hip frame 102 in FIG. 1), at the end of which there is an actuator 2 in the form of an electric motor. Via a control unit not shown here, an output flange 3 of the actuator 2 can be actively rotated horizontally about a first axis of rotation shown in dashed lines. Attached to the output flange 3 is a channel-and-support structure, designated as leg member 5, which can be rotated about a second axis of rotation (dashed line) aligned perpendicular to the aforementioned first axis of rotation. The second axis of rotation is arranged in the sagittal plane. A thigh plate 8 is arranged on the leg member 5 via means for height adjustment 6 for contact with the thigh of the wearer. The thigh support structure, referred to here as thigh plate 8, has a tilting joint 7 with a defined play for a better adaptation to the orientation of the thigh. A soft and compressible thigh pad 9 is attached to the thigh plate 8. Furthermore, a distance sensor is arranged in the thigh plate 8 analogous to the thigh support structure described below in relation to FIG. 3. The distance sensor is connected to a control unit of the exoskeleton via signal lines not shown here and transmits a measured distance between the distance sensor and the thigh in real time.

To put on an exoskeleton comprising the thigh support structure 8, the wearer only needs to don an upper body connection structure equipped with a carrying harness and to position (“folding inwardly”) the thigh support structure 8 in front of his or her thigh via the passively rotatable second swivel joint 4. An additional attachment via strappings engirding the thigh is not necessary.

Figure 3:
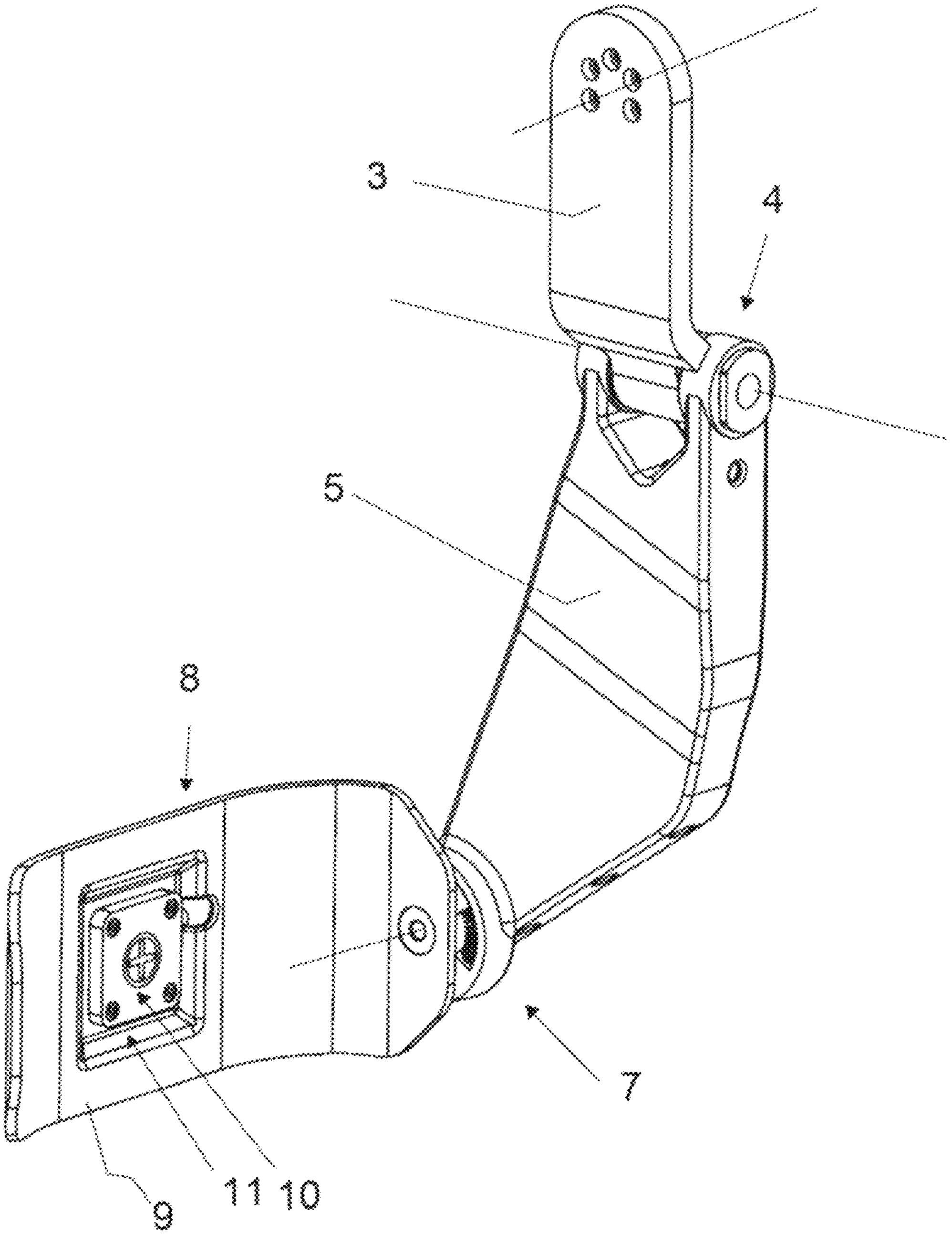

The means for attaching a right thigh shown in FIG. 3 is essentially the same as the thigh support structure in FIG. 2, although in contrast to the thigh support structure 8 in FIG. 2, a height adjustment (reference sign 6 in FIG. 2) for adaptation to the anatomical conditions of the wearer has been dispensed with. Here, too, the thigh support structure is designed as a half shell for positive, formfitting contact with a front part of the thigh. The depicted means for attaching a right thigh also has an output flange 3 connected to an actuator not shown, which can be actively rotated by the actuator at an upper end with respect to a horizontal which is transverse to the sagittal plane and whereby a beam 5 is connected to a lower end of the output flange via a passive swivel joint 4. A plate-shaped thigh support structure 8 is attached to the lower end of the beam 5 via a tilting joint 7, which has a pocket 11 in which a distance sensor 10 is arranged. The pocket 11 is so deep that the distance sensor 10 cannot come into direct contact with the wearer’s thigh.

The means for attaching a right thigh shown in FIG. 2 and FIG. 3 can be used in the sense of an exoskeleton 100 shown schematically below, cf. FIG. 4 to FIG. 7.

In FIGS. 4 to 7, directions are given in Cartesian coordinates, where Y is the vertical axis, Z is the forward horizontal axis and X is the horizontal axis pointing into the drawing plane of the figures. As before, directions always refer to the directions commonly used in anatomy (frontal plane, sagittal plane, transversal plane and the corresponding directions).

In FIG. 4 to FIG. 7, an exoskeleton 100 is shown schematically in a side view (sagittal plane) in different positions. The exoskeleton 100 has an upper body connection structure 101, for example, analogous to the example in FIG. 1, with a harness and a hip bracket, whereby an actuator 103A/B is arranged laterally on the hip bracket to support the left and right thigh respectively. At the output of the actuators 103A/B, a channel-and-support structure 106A/B is arranged, analogous to FIG. 2 or FIG. 3, with a thigh attachment structure 104A/B (A for left and B for right). The channel-and-support structure 106A/B is actively rotatable about the axis designated DGH (“Drehgelenk Hüfte” in German=pivot joint hip) via the actuator associated with it. The axis largely coincides with the axis of rotation of a hip joint of the wearer.

An inertial unit IMU is attached to the upper body connection structure 101 at a suitable location. The inertial unit IMU is equipped with sensor technology for detecting an erection angle $\alpha$ and with sensor technology for detecting the rate of change of the erection angle $\alpha$. In particular, it may be a gyroscope unit, for example. The erection angle $\alpha$ designates the (absolute) orientation or the angle $\alpha$ with respect to the vertical, see FIG. 5.

Furthermore, suitable sensor technology is provided in the actuators 103A/B for detecting the torques applied in the actuators 103A/B, as well as the absolute angular position of the actuators 103A/B and the rate of change of the torques and rates of change of the absolute angular positions. The absolute angular position of the actuators corresponds in each case to an inclination angle $\beta$ ($\beta_1$ or $\beta_2$) of the channel-and-support structures 106A/B relative to the upper body attachment structure.

Figure 4:
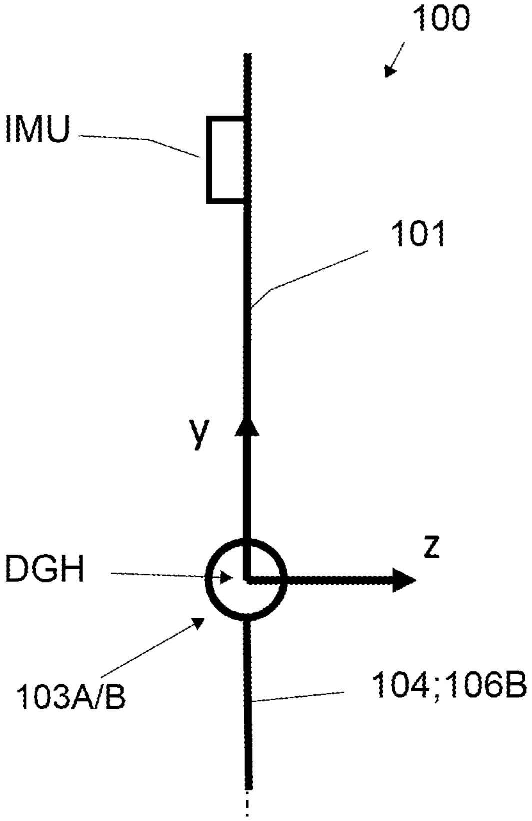

The inclination angles $\beta$ are to be understood as the relative deviation of the channel-and-support structures 106A/B from a normal position; the normal position is that in which the upper body connection structure 101 encloses an angle of 180° with a channel-and-support structure 106A/B—in other words a position in which the channel-and-support structures 106A/B are aligned in straight extension of the upper body connection structure 101, as shown in FIG. 4.

The exoskeleton 100 of FIGS. 4 to 7 also comprises a control unit for controlling and regulating the exoskeleton 100, in particular its actuators 103A/B, which is described in more detail below in relation to FIGS. 9 and 10. A distance sensor, as shown in the embodiments of FIG. 2 and FIG. 3, is also incorporated in each of the thigh support structures 104A/B, which transmit the current distance between the distance sensor and the thigh assigned to it to the control unit in real time.

FIG. 4 shows a normal position of the exoskeleton 100, which corresponds to the posture of an upright person, i.e. with an erection angle $\alpha$ of the upper body connection structure 101 of 0° and two inclination angles $\beta_1$ and $\beta_2$ of the channel-and-support structures 106A/B each having an angle of 0°.

Figure 5:
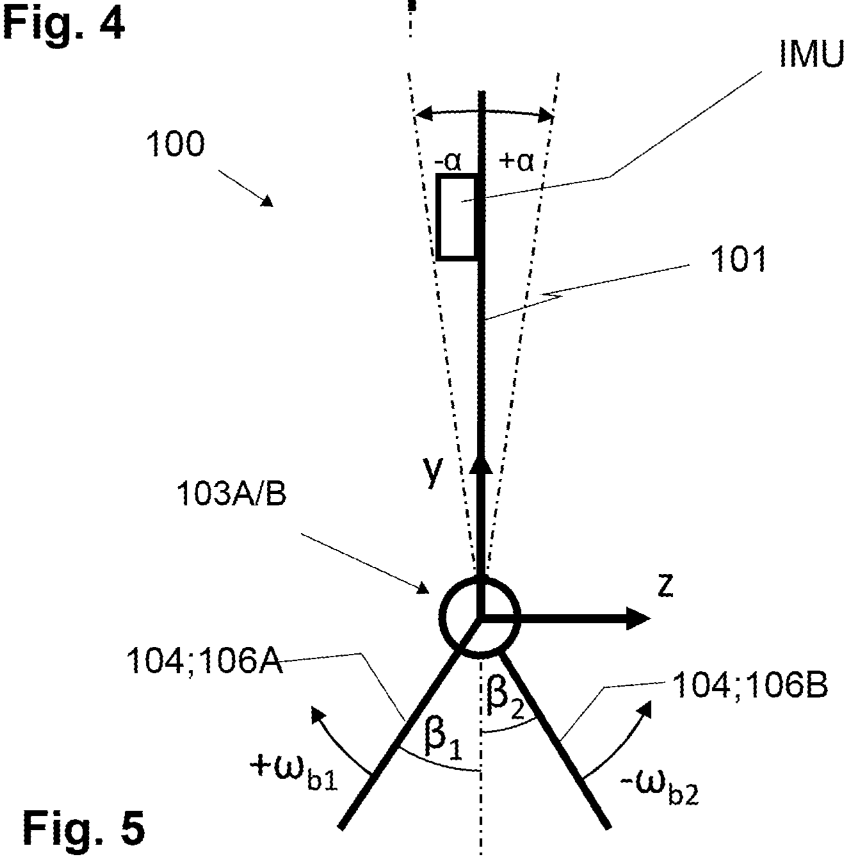

In FIG. 5, the exoskeleton 100 is shown in a first operating mode (idle mode) in which a wearer of the exoskeleton 100 is walking normally, for example. Its thighs and the associated channel-and-support structures 106A/B will therefore always oscillate in opposite directions in an alternating manner, so that the inclination angle $\beta$ are (almost) always unequal and the rates of change co of the inclination angle $\beta$ are always different, namely opposite. During normal walking, the erection angle $\alpha$ fluctuates approximately in the range of +−20° from the vertical as shown.

In the first operating mode, the control unit controls the actuators 103A/B in such a way that a predefined distance between each of the thigh support structures 104A/B and the thighs of the wearer associated with them is maintained at any time. The thigh attachments 104A/B therefore always hover in front of the respective (moving) thigh.

This first operating mode is not changed as long as the erection angle $\alpha$ is within a predetermined angular range. This angle range is indicated in FIG. 5 with +−$\alpha$. Furthermore, the first operating mode is not quit as long as the inclination angles $\beta_1$ and $\beta_2$ of the channel-and-support structures 106A/B diverge from each other sufficiently and, in addition, as long as the rates of change $\omega_{b1}$ and $\omega_{b2}$ of the inclination angles $\beta_1$ and $\beta_2$ have opposite signs at the same time.

In other words, the control unit detects whether the wearer is in a locomotion mode that can be described as walking and controls the actuators 103A/B in such a way as to maintain a constant distance from the thighs.

Figure 6:
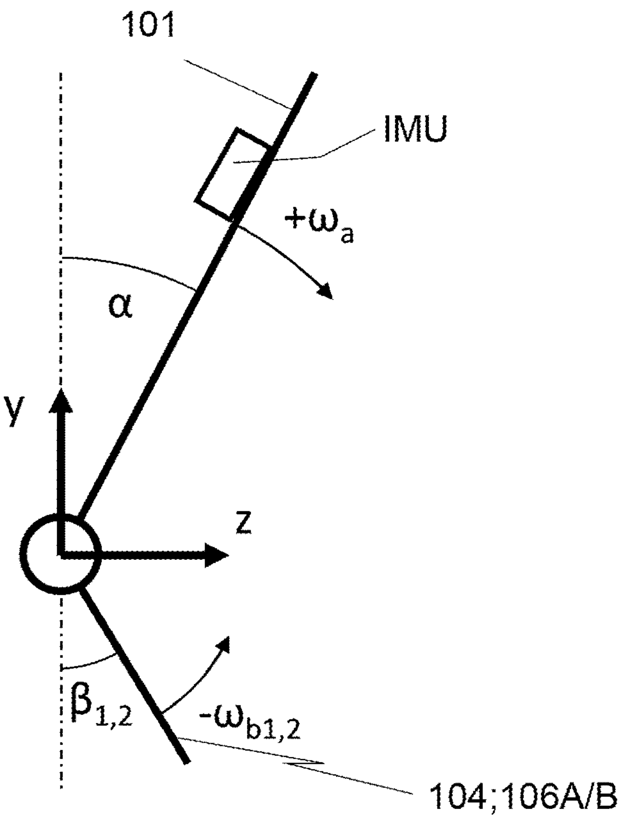

In FIG. 6, a condition is shown in which the wearer of the exoskeleton 100 has set out to lift or raise an object so that the erection angle $\alpha$ of the upper body connection structure 101 moves outside the predetermined angular range+−$\alpha$, which causes a change of the operation mode of the control unit from the first operation mode to the second operation mode. In this state, the inclination angles $\beta_1$ or $\beta_2$ and the rates of change $\omega_{b1}$ or $\omega_{b2}$ of the inclination angles $\beta_1$ or $\beta_2$ are substantially the same and directed in the same direction. This allows the control unit to verify the intention of the wearer to pick or lift an object. The control unit will then switch to the second 'classic' operating mode, in which the wearer is actively supported by the actuators 103A/B. During the transition between the first and the second operating mode, the distance between the thigh support structures 104A/B and the thighs should first be reduced to 0, i.e. contact should be established, before a force is introduced, as the wearer would otherwise experience sudden or abrupt force applications at the thighs.

Figure 7:
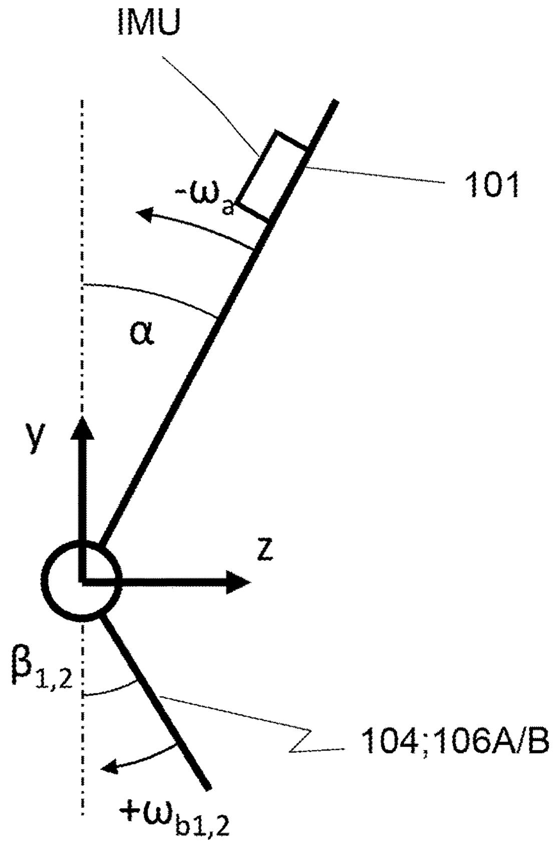

In FIG. 7, the exoskeleton 100 is shown in a state in which the wearer straightens up again from a bending or stooping position. The erection angle $\alpha$ of the upper body attachment structure 101 moves back into the predefined angle range of less than 20°. At the same time, both channel-and-support structures 106A/B move substantially synchronously in the direction of the initial position, with both inclination angles $\beta_1$ and $\beta_2$ simultaneously entering an angular range of magnitude smaller than 20°. The rates of change $\omega$ of the inclination angles $\beta$ are also positive. Since in this case the inclination angles $\beta_1$ or $\beta_2$ and the erection angle $\alpha$ enter the predetermined angular range, the control unit changes from the second to the first operating mode.

Figure 8:
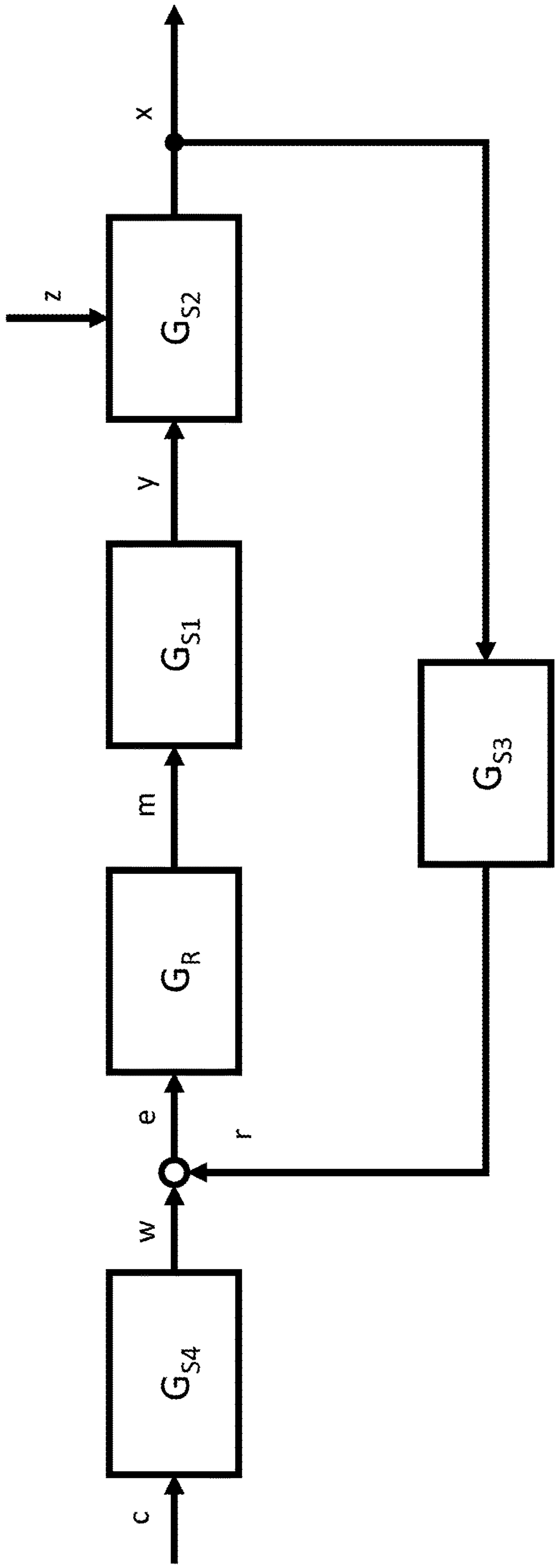
Figure 9:
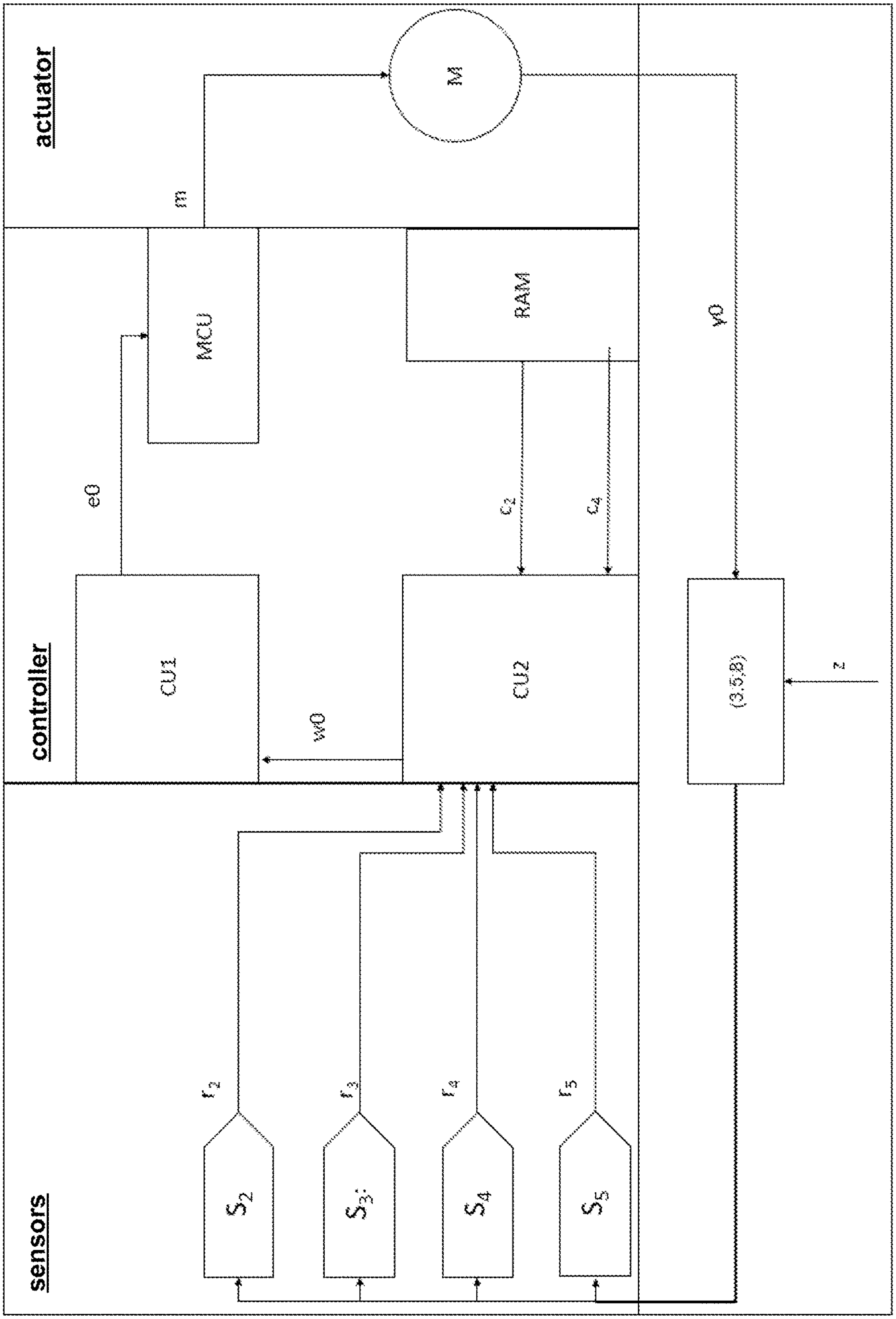
Figure 10:
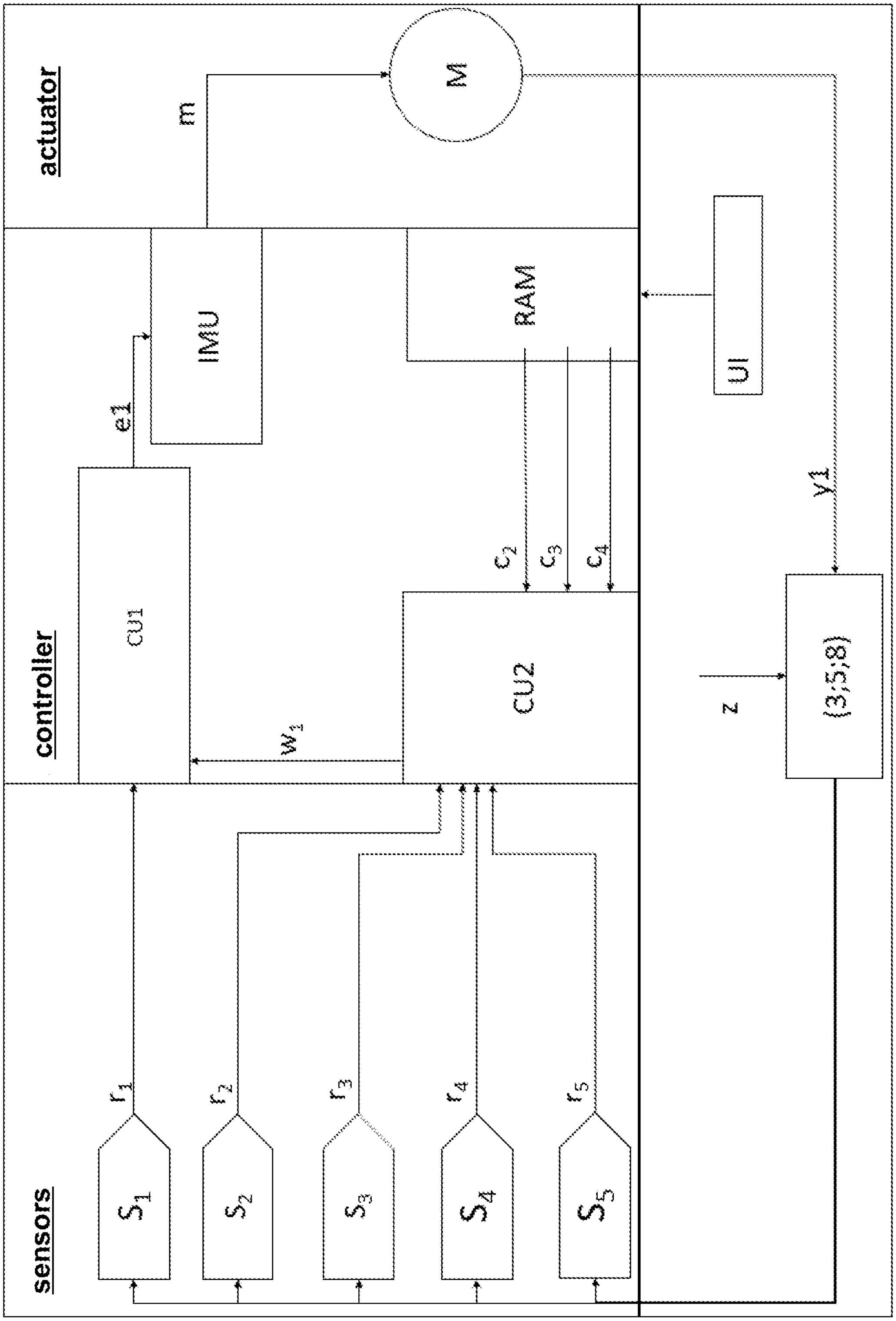

For a better understanding of the control loops of the first and second operating modes shown in FIGS. 9 and 10, the control structure of a general control loop is shown in FIG. 8. The control loop consists of a setpoint adjuster $G_{S4}$, which receives a setpoint value c and derives a reference variable w from it. The reference variable is then compared with a tracked variable r, generating a tracking difference e. The tracking difference e is processed by a controller $G_R$ into a controller output variable m, which in turn serves as the input variable of an actuator $G_{S1}$. The actuator $G_{S1}$ calculates an actuating variable y from this, which is fed into a controlled system $G_{S2}$. The controlled system $G_{S2}$ is subject to the influences of a disturbance variable z. This results in a controlled variable x as an actual value at the output of the controlled system $G_{S2}$, which is detected by a sensor $G_{S3}$ and fed back into the control loop.

All control variables can also be understood multidimensional, e.g. as a vector with a multitude of individual entries.

For the present case, a control loop according to the invention can be designed according to the illustrations of FIG. 9 for the first operating mode and FIG. 10 for the second operating mode of an exoskeleton, wherein a control unit (also: controller) changes between the first operating mode (FIG. 9) and the second operating mode (FIG. 10) depending on previously described boundary conditions such as, for example, the entry or exit of the above-mentioned erection angle into and out of a certain angular range.

In FIGS. 9 and 10, only the control loop for one (right) side of an exoskeleton is shown in abbreviated form using the example of the thigh support structure from FIG. 3. A distinction of the designation for sensors arranged on the left or right side of the exoskeleton, e.g. S2A and S2B, or left and right side thigh support structures assigned to the sensors with channel-and-support structures and actuator attachments (3,5,8A or 3,5,8B) has been omitted, but may be complemented in the light of the above made explanations.

The control circuit in the first operating mode (idle mode), as shown in FIG. 9, has the objective of controlling a measured distance (controlled variable x) between the thigh support structure 8 and the thigh of the wearer, whereby in the case shown a target distance c2 of e.g. 2 mm is stored in a memory RAM of the controller. In the event of a deviation from this value, the controller shall control the actuator (the actuator $G_{S1}$ of the controlled system) such that the value is reached. For this purpose, the controller uses measurement signals r2 to r5 from sensors S2 to S5 as measured variables (feedback variables).

The sensors S2 to S5 are as follows: S2 corresponds to the above-mentioned inertial measurement unit (IMU), which measures the erection angle $\alpha$ of the upper body connection structure 101 as well as the rate of change of the erection angle (r2). S3 represents the measurement sensor for the angular position of the actuator 2, i.e. the inclination angle β of the channel-and-support structure in the form of the angular position of the output flange 3 of the actuator 2 (angle absolute encoder) (r3). S4 represents the distance sensor 10 of the thigh support structure 8 and measures the distance between the thigh support structure 8 and the thigh of the wearer (r4). S5 stands for the Hall sensor necessary for a pulse width modulated control of the actuator M, which measures the angular velocity of one rotor or the rotor of the actuator M (r5).

The controller has a setpoint adjuster, designated as CU2, which processes the measurement signals together with setpoint values into a reference variable w0. The reference variable w0 is the delta between the distance r4 measured via the distance sensor 10 and the setpoint distance c4. A controller control unit CU1 calculates a suitable actuating difference e0 in the form of speed command and direction of rotation command for the actuator on the basis of the reference variable w0 and the measurement signals r2 to r5. The speed command and direction of rotation command e0 is then converted by a motor control unit designated as MCU into a suitable control signal m of an actuator M or of the actuator M connected to the output flange 3. This leads to the movement of the actuator M and thus at the same time to the movement of the channel-and-support structure 5 with the thigh support structure 8. This causes a change in the angular position y0 of the channel-and-support structure 5 and at the same time a change in the (measured) distance r4 of the distance sensor 10 from the thigh of the wearer. The corresponding changes in the measurement signals of the sensors S2 to S5 are fed back into the control loop as the feedback variables r2 to r5, whereby these are also influenced by the movements introduced by the wearer of the exoskeleton (disturbance variable z), in particular forward and backward movements of the thighs.

Suitable conditions are stored in the RAM of the controller at which a change from the first to the second operating mode is to take place. This is indicated by the value c2, which represents a permissible angle range for the erection angle α of the upper body connection structure. The setpoint adjuster CU2 checks for the presence of the conditions and changes the operating mode, if necessary.

In the second operating mode shown in FIG. 10, the back muscles of the wearer are to be relieved during bending and lifting by actively applying force to the wearer's thigh. The controller therefore does not control a distance, but a torque of the actuator M. For this case, the thigh support structure 8 rests on the thigh of the wearer. The setpoint adjuster CU2 will calculate a torque reference value w1 depending on support settings stored in the memory RAM (adjustable via a user interface UI), which is converted into a torque difference value e1 (control difference) by the controller CU1. On the basis of the torque difference value e1, the motor control unit IMU calculates a control signal m for the actuator M, which then introduces a force y1 into the thigh of the beam via the channel-and-support structure 5 or thigh attachment structure 8 and thereby supports the straightening of the wearer.

At the same time, the setpoint adjuster CU2 checks whether conditions for a change to the first operating mode are present or not. In addition to the predefined angular range of the erection angle, this can also be, for example, an asynchronous movement of the channel-and-support structures 5A/B, which can be measured by comparing the inclination angles of both channel-and-support structures 5A/B. This can be used to detect when the wearer begins to walk and active support shall be provided no more.

In contrast to the first operating mode, a torque sensor S1 of the actuator M, which measures the torque applied to the actuator, is necessary in the second operating mode.

The above-described examples of embodiment were described on the basis of the control of exoskeletons for supporting bending and lifting movements, but can of course also be transferred to comparable exoskeletons for supporting other body parts such as the neck, lower leg, upper or lower arms and fingers (with corresponding attachment structures for these body parts). A limitation of the invention idea by the embodiment examples is naturally not intended.

The invention described may provide exoskeletons with automatic switching between a walking mode with a high level of comfort for the wearer and a support mode with active support for the wearer.

LIST OF REFERENCE SIGNS

DGH hip swivel joint/actuator
IMU Intertial measurement unit
CU1 Setpoint adjuster/control unit
CU2 Control unit
MCU motor control unit
(α) Erection angle of the upper body
(β) Inclination Angle of the channel-and-support-structure (extremity)
(ω) Rate of change of an inclination angle (β)
1 Hip bracket/hip frame
2 Actuator
3 Output flange
4 horizontal joint (sagittal plane)
5 channel-and-support structure (leg member/beam)
6 Height adjustment
7 Tilting joint
8 thigh support structure (thigh plate)
9 thigh pad
10 Distance sensor
11 pocket
100 Exoskeleton
101 upper body connection structure (harness)
102 Hip frame
103 Actuator
104 Thigh support structure with straps
106 channel-and-support structure/beam (thigh support structure)
c Setpoint value
w Reference variable
e tracking difference
m output variable
y actuating variable
z Disturbance variable
x Controlled variable (actual value)
r Feedback variable
$G_R$ Controller
$G_{S1}$ Actuator
$G_{S2}$ controlled system
$G_{S3}$ Sensor
$G_{S4}$ Setpoint adjuster
S1 Torque sensor (actuator)
S2 IMU—accelerometer+gyroscope (upper body)
S3 Angle absolute encoder (actuator)
S4 Proximity sensor (thigh support structure)
S5 Hall sensors (actuator)
m PWM signal
M Actuator (electric motor)
Z Movement of the user (disturbance variable)
e0 Speed and direction [±1/min]

e1 difference value [Nm]
r1 Torque [Nm]
r2 Angle and angular velocity of the structure/upper body [rad, rad/s].
r3 Angle of the thigh support structure [°]
r4 Distance between thigh support structure and user [mm]
r5 Angular velocity of the motor/drive
y0 Inclination Angle change rate [°]
y1 Force application in thigh
w0 reference value target distance [±mm]
w1 Torque reference value [Nm]
UI User Interface/User Inputs

The invention claimed is:

1. An exoskeleton comprising: an upper body connecting structure; a hip frame fixedly connected to the upper body connecting structure; a first and a second actuator attached to the hip frame for supporting a walking or bending movement of a wearer; a first and a second thigh attachment structure respectively associated with one of the first and second actuator; a first and a second channel-and-support structure for transmitting forces between a respective thigh attachment structure and the actuator associated with the respective thigh attachment structure; and a control unit for controlling the first and second actuators, wherein a distance sensor for contactless tracking of a position of a thigh of the wearer relative to the thigh attachment structure is arranged in each thigh attachment structure, and wherein the control unit is set up to control the first and second actuators in a first operating mode without supporting a walking movement in such a way that each thigh attachment structure is continuously positioned at a predefined distance unequal to 0 from the associated thigh based on the distance sensor.

2. The exoskeleton of claim 1, wherein each distance sensor is a capacitive, an optical or an ultrasonic distance sensor.

3. The exoskeleton of claim 1, wherein each distance sensor is arranged in a pocket of its respective thigh attachment structure, whereby a defined distance between the distance sensor and the thigh is preserved even when the thigh attachment structure is in contact with the corresponding thigh.

4. The exoskeleton of claim 3, wherein the control unit is set up to control the first and second actuators in a second operating mode for supporting the bending movement in such a way that each thigh attachment structure remains in continuous contact with the associated thigh for the purpose of force transmission.

5. The exoskeleton of claim 4, wherein the exoskeleton comprises an inertial unit for detecting an erection angle of the upper body connecting structure with respect to the vertical, wherein the control unit is arranged to either remain in the first operating mode, or to change from the second to the first operating mode when the erection angle of the upper body connecting structure ranges in between a predetermined angular range with respect to the vertical.

6. The exoskeleton of claim 5, wherein the control unit is set up to remain in the second mode of operation or to change from the first to the second mode of operation when the erection angle of the upper body connecting structure moves outside of the predetermined angular range.

7. The exoskeleton of claim 5, wherein the exoskeleton further comprises two angle sensors for detecting inclination angles in the sagittal plane between the upper body connecting structure and each of the channel-and-support structures, wherein the control unit is arranged to change from the first operating mode to the second operating mode when both inclination angles of the channel-and-support structures enter substantially synchronously a predefined angular range, wherein the control unit is set up to change from the second to the first operating mode when both inclination angles of the channel and-support structures exit the predefined angular range substantially synchronously.

8. The exoskeleton of claim 5, wherein the inertial measurement unit comprises an acceleration sensor for detecting acceleration values of the upper body connecting structure and the exoskeleton further comprises first and second angular velocity sensors for detecting an angular velocity of the first and second actuators, respectively, and first and second torque sensors for detecting torques applied to the first and second actuators, respectively.

9. The exoskeleton of claim 8, wherein the control unit is set up to change from the first to the second operating mode when one of the torque sensors measures a torque other than 0.

10. The exoskeleton of claim 1, wherein each thigh attachment structure is designed as a rigid half shell covering an anterior part of the thigh.

11. The exoskeleton of claim 1, further comprising a compressible thigh pad attached to each thigh attachment structure.

12. The exoskeleton of claim 1, wherein the predefined distance is between 2 mm and 6 mm.

13. A method for controlling an actuator of a channel-and-support structure of an exoskeleton via a control unit, the channel-and-support structure having an attachment for supporting an extremity of a wearer and a distance sensor for measuring a distance between the attachment and the extremity arranged in the attachment, the method comprising:

controlling the actuator with the control unit in a first operating mode in such a way that the attachment is kept at a predefined distance from the extremity based on the distance sensor and controlling the actuator in a second operating mode in such a way that the attachment bears against the extremity in a force-conducting manner, whereby the control unit changes between the first and the second operating modes as a function of at least one variable of the following group:

an erection angle of an upper body of the wearer, a rate of change of the erection angle, an inclination angle of the extremity or a second extremity, the inclination angle of the extremity or the second extremity, a comparison of the inclination angle of the extremity with a second inclination angle of the second extremity of the wearer, and a torque applied to the actuator.

* * * * *